(12) United States Patent
Meteyer et al.

(10) Patent No.: US 7,379,929 B2
(45) Date of Patent: May 27, 2008

(54) AUTOMATICALLY IDENTIFYING REQUIRED JOB CRITERIA

(75) Inventors: Lisa C. Meteyer, Sunnyvale, CA (US);
Raj Kalidindi, Sunnyvale, CA (US);
Yue-Sheng Liu, Pleasanton, CA (US);
Fred Sayama, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 902 days.

(21) Appl. No.: 10/673,035

(22) Filed: Sep. 25, 2003

(65) Prior Publication Data
US 2005/0050440 A1    Mar. 3, 2005

Related U.S. Application Data

(60) Provisional application No. 60/500,176, filed on Sep. 3, 2003.

(51) Int. Cl.
*G06G 17/30* (2006.01)
*G06F 17/20* (2006.01)

(52) U.S. Cl. ................. 707/3; 707/4; 704/1
(58) Field of Classification Search ............ None
See application file for complete search history.

(56) References Cited

U.S. PATENT DOCUMENTS

| | | | |
|---|---|---|---|
| 5,164,897 A * | 11/1992 | Clark et al. ............ | 705/1 |
| 5,832,497 A * | 11/1998 | Taylor ............ | 707/104.1 |
| 6,226,630 B1 * | 5/2001 | Billmers ............ | 707/3 |
| 6,249,784 B1 * | 6/2001 | Macke et al. ............ | 707/3 |
| 6,662,194 B1 * | 12/2003 | Joao ............ | 707/104.1 |
| 7,096,420 B1 * | 8/2006 | Peikes ............ | 715/513 |
| 2002/0091689 A1 * | 7/2002 | Wiens et al. ............ | 707/6 |
| 2002/0116203 A1 * | 8/2002 | Cherry et al. ............ | 705/1 |
| 2003/0125970 A1 * | 7/2003 | Mittal et al. ............ | 705/1 |
| 2003/0187842 A1 * | 10/2003 | Hyatt ............ | 707/5 |
| 2003/0229638 A1 * | 12/2003 | Carpenter et al. ............ | 707/10 |
| 2004/0148180 A1 * | 7/2004 | Pajwani ............ | 705/1 |
| 2004/0167941 A1 * | 8/2004 | Prahlad et al. ............ | 707/204 |
| 2005/0033698 A1 * | 2/2005 | Chapman ............ | 705/51 |
| 2006/0100919 A1 * | 5/2006 | Levine ............ | 705/11 |
| 2007/0022188 A1 * | 1/2007 | Kohs ............ | 709/223 |

OTHER PUBLICATIONS

International Preliminary Examining Authority, "Notification of Transmittal of the International Preliminary Report on Patentability," PCT/US2004/028903, Sep. 19, 2005, 7 pages.
Current Claims, PCT/US2004/028903, 3 pages.
International Preliminary Examining Authority, "Notification Concerning Informal Communication With the Applicant," PCT/US2004/028903, dated Sep. 19, 2005, 3 pages.

* cited by examiner

*Primary Examiner*—David Hudspeth
*Assistant Examiner*—Matthew J. Sked
(74) *Attorney, Agent, or Firm*—Hickman Palermo Truong & Becker LLP

(57) ABSTRACT

A technique is disclosed for automatically identifying a criterion of designated type. The technique comprises providing a description; identifying a passage of the description with a predefined trigger phrase; determining whether the passage includes a type of criterion; and identifying a criterion within the passage as being the same type of criterion associated with the trigger phrase

22 Claims, 3 Drawing Sheets

AUTOMATICALLY IDENTIFYING REQUIRED JOB CRITERIA

CROSS REFERENCE TO RELATED APPLICATIONS

This application claims priority to the U.S. Provisional Patent Application 60/500,176 entitled "METHOD FOR AUTOMATICALLY IDENTIFYING REQUIRED JOB SKILLS" filed Sep. 3, 2003, which is incorporated herein by reference for all purposes.

The present invention relates generally to computer software. More specifically, a technique for assisting in criteria search is disclosed.

BACKGROUND OF THE INVENTION

A challenge common to nearly all companies is hiring the most talented employees. Finding the best candidates can be a very daunting task for a recruiter or hiring manager due to an overwhelming volume of resumes available. As a result, many companies rely on automation to help with the task of finding qualified candidates in a large candidate pool. The standard practice within a human resources department is to create a job requisition and associated description for each open position. The requisition is then typically posted or advertised so that potential candidates can locate and review it. In order to identify qualified candidates the recruiter often performs a resume search using an automated system. The recruiter typically faces the task of choosing appropriate search terms and formulating potentially complex queries to perform the search.

It would be desirable to simplify the process of searching for qualified candidates. The present invention addresses such a need.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
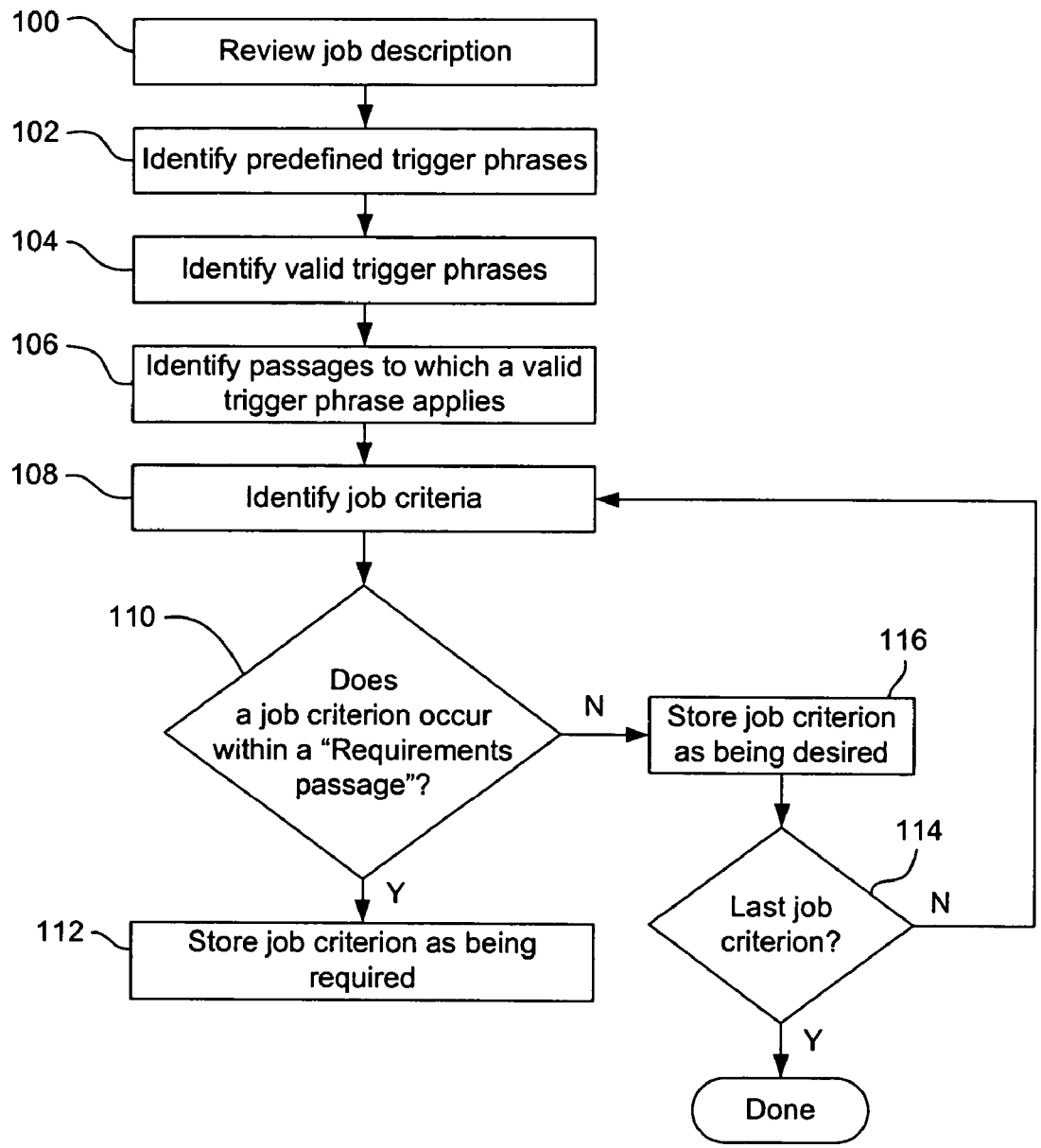
FIG. 1 is a flow diagram of a technique for automatically identifying required criteria from a job description text according to an embodiment of the present invention.

FIG. 1 is a flow diagram of a technique for automatically identifying required criteria from a job description text according to an embodiment of the present invention. In this example, a job description is reviewed (100). For example, each word within the job description can be reviewed. Although job descriptions are used herein, it is merely used for illustrative purposes. Other descriptions can be used such as those for on-line dating services.

In this embodiment, passages with predefined trigger phrases are then identified (102), and those phrases are further checked for validity (104). Examples of predefined trigger phrases for determining what are required criteria for a particular job description include the following: verb forms of the word "require", "requirement", "compulsory", "crucial", "essential", "got to", "has to", "have to", "imperative", "is/are key", "key skill", "key criteria/qualification", "mandatory", "must", "prerequisite", and "vital". In some embodiments, trigger phrases are considered valid as long as they are not preceded or followed by a negating word such as "no", "not", or "never", and do not appear within a list of nontrigger words or phrases. A nontrigger phrase may contain a predefined trigger phrase but is not indicative of a description that actually defines the criteria. For example, if "essential" is predefined as a trigger phrase, then nontrigger phrases can include: "essential information", "essential nutrient(s)", "essential mix", and "essential element(s)". Likewise, if "vital" is a trigger phrase then nontrigger phrases may include "vital statistic(s)", "vital sign(s)", and "vital record(s)".

Passages around predefined trigger phrases can be identified in various ways, depending upon the type of written description. For example, a job description passage with a predefined trigger phrase can be identified as a "requirements" passage if it is a clause containing a valid trigger phrase. For example, the following statements could be identified as job description passages with valid trigger phrases. "Must be strong with Excel." "Oracle experience required." "At least three years of business/commercial lending experience required." "[Strong interpersonal skills,] paired with the ability to build effective teams will be crucial in this role." In the last example, the text in brackets would not be part of the requirements passage since it occurs in a different clause than the trigger phrase "crucial".

Another example of identifying passages, such as requirements passages, can be a paragraph that starts with a valid trigger phrase followed closely by a colon, a hyphen (two dashes), and/or new line(s), up to the end of the first sentence. Examples of identifying such a passage include the following.

"REQUIREMENTS: Must be persistent, energetic and entrepreneurial and available for local travel. [Prior experience in the construction, equipment or tool industry is preferred . . . ]"

"PREREQUISITE SKILLS and REQUIREMENTS:

Outstanding customer service and relationship building skills.

[Proven track records of successful sales management . . . ]"

In these examples, the text in brackets is not part of the requirements passage since it occurs after the end of the first sentence following the valid trigger phrase.

In the example shown in FIG. 1, passages are identified to which a valid trigger phrase applies (106). Such a passage can be referred to as a "requirements passage", in this example. Job criteria are then identified in the job description (108). It is then determined whether a requirements passage includes a job criterion (110). In other words, it is determined whether a particular skill described in the job description is required of the candidate. An example of this determination is if a predefined trigger phrase found in the passage is a required criterion trigger phrase. If the passage includes a required criterion trigger phrase, then each job criterion within the passage is stored as being required in this example (112).

In one embodiment, if the passage does not include a required criterion (110), then it may be called a "desired criteria" passage. For example, "Prior experience in the construction industry is preferred" would be a desired criteria passage if it does not contain a valid, required criterion trigger phrase. If a job criterion occurs within a desired criteria passage, the criterion is stored as being a desired criterion (114).

It is then determined whether this job criterion is the last job criterion (116). If it is the last criterion, then the process is complete. If, however, it is not the last criterion, then a particular job criterion is identified in the description (108).

Figure 2A:
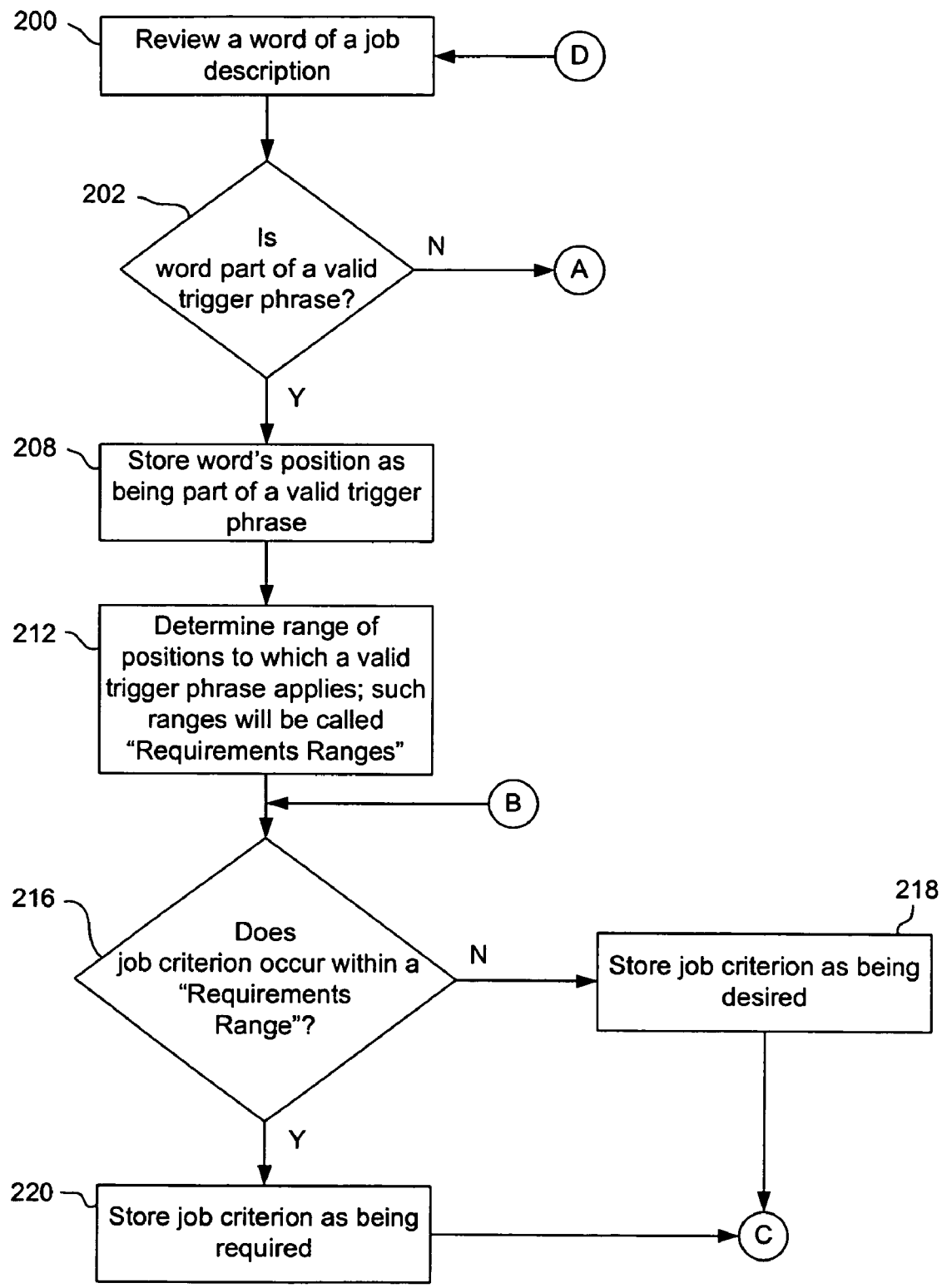
FIGS. 2A-2B show another example of a technique for automatically identifying required job criteria from a job description text according to an embodiment of the present invention.
Figure 2B:
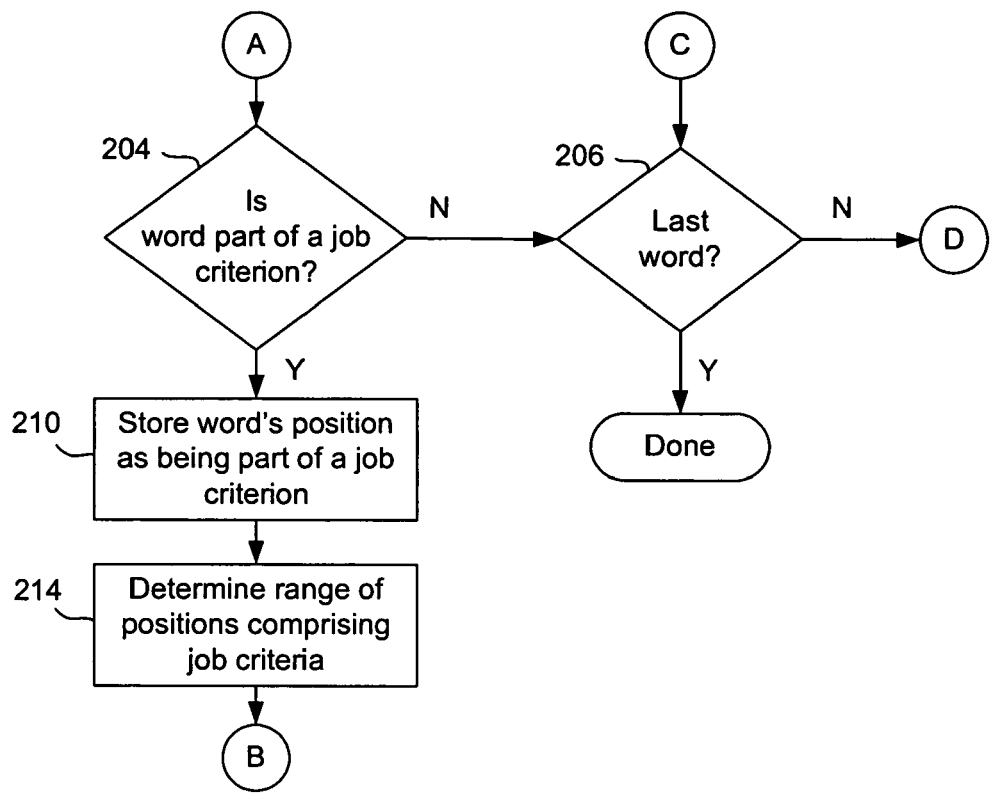

FIGS. 2A-2B show another example of a technique for automatically identifying required job criteria from a job description text according to an embodiment of the present invention. In this example, a word of a job description is reviewed (200). It is determined whether the word is part of a valid trigger phrase (202). If it is part of a valid trigger phrase, then the position of the word is stored (208). A range of positions for the requirements passage is then determined (212). Assume for example, that the valid trigger phrase is "necessary", and it is found in the job description at position number 17. Also assume that there is a set of predetermined rules, such as "any clause containing a valid trigger word/phrase" or any other rule, that can be used to determine a requirements passage. Then the position number of the trigger phrase and the rule can be used to determine the range of positions for the requirements passage. For example, if the passage is "Oracle experience is necessary.", and "necessary" is at position number 17, then the range of positions for the requirements passage is position 14-17.

If the word being reviewed in the job description is not part of a valid trigger phrase (202), then it is determined whether the word is part of a job criterion (204). If the word is part of a job criterion, then the position of the word is stored (210). Existing computerized technology, such as Resumix Knowledge Base and Extractor, can be used to determine the job criteria from a job description. Assume, for example, that the job description includes the passage "Oracle experience is necessary". Also assume that "Oracle experience" is determined to be a job criterion and occurs at position numbers 14-15. Then the position numbers 14-15 are stored as the range for a job criterion (214).

It is then determined whether the range of a job criterion lies within the range of a requirements passage (216). A job criterion that does occur within a requirements passage is stored as being required (220). Otherwise it is stored as being desired (218).

It is then determined whether the particular word being reviewed is the last word of the description (206). If it is the last word in the job description then the process is complete. If, however, it is not the last word then another word of the job description is reviewed (200).

Figure 3:
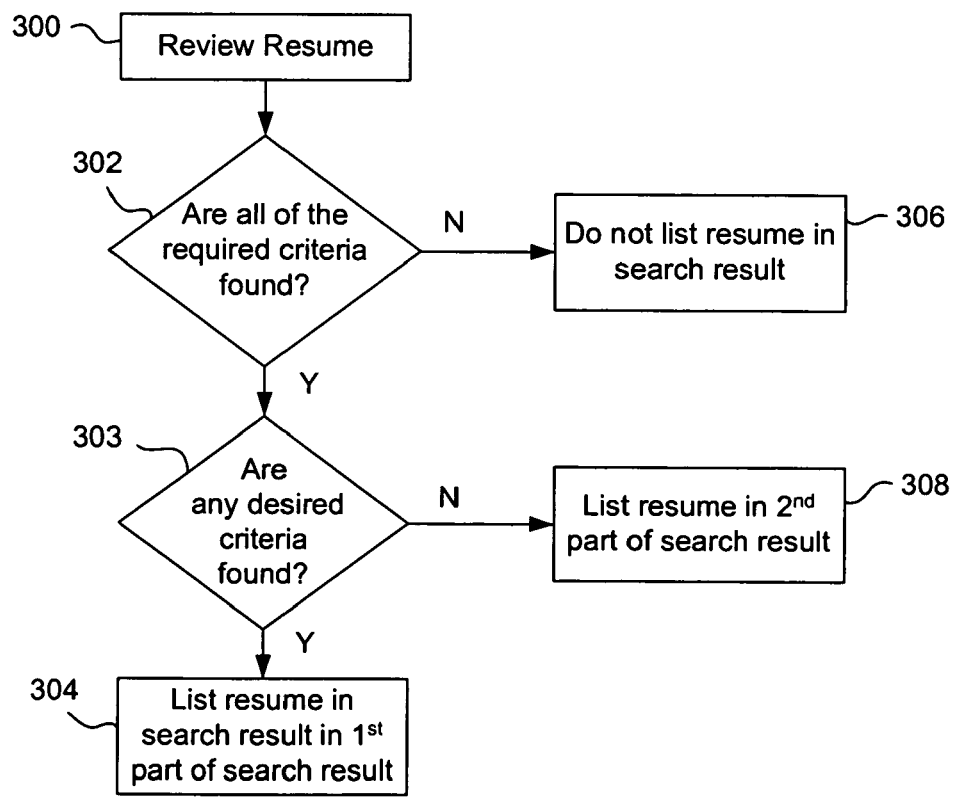
FIG. 3 is a flow diagram of a technique according to an embodiment of the present invention for applying required criteria to a resume.

FIG. 3 is a flow diagram of a technique according to an embodiment of the present invention for applying required criteria to a resume. In this example, a resume is reviewed (300). It is then determined whether all of the required criteria of a particular job description were found (302). If not all of the required criteria were found in the resume, the resume is not listed in the search result associated with this particular job description (306). If, however, all the required criteria were found (302), then it is determined whether any desired criteria associated with this particular job description were found (303). If no desired criteria were found but all of the required criteria were found in this resume, then the resume is listed in a secondary portion of the search result (308). If, however, desired criteria were found in this resume (303), along with all of the required criteria (302), then this resume is listed in a primary part of the search result (304). Accordingly, a recruiter performing a search for a particular job description can view a search result where a candidate with all of the required criteria and at least one of the desired criteria is listed above a candidate who simply has all of the required criteria but none of the desired criteria.

Some embodiments of the present invention can be used in conjunction with Resumix Knowledge Base And Extractor by Yahoo! Resumix in Sunnyvale, Calif. Accordingly, U.S. Pat. No. 5,197,004 entitled METHOD AND APPARATUS FOR AUTOMATIC CATEGORIZATION OF APPLICANTS FROM RESUMES, and U.S. Pat. No. 5,164,899 entitled METHOD AND APPARATUS FOR COMPUTER UNDERSTANDING AND MANIPULATION OF MINIMALLY FORMATTED TEXT DOCUMENTS, are herein incorporated by reference for all purposes.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method of providing search results from a search of candidate resumes, said method comprising the machine-implemented steps of:

identifying a first passage in a job description that includes a first trigger phrase from a first set of predefined trigger phrases, wherein said first set of predefined trigger phrases is associated with a first type of criterion;

extracting a first criterion from the first passage, wherein said first criterion is associated with the first type of criterion;

identifying a second passage in the job description that includes a second trigger phrase from a second set of predefined trigger phrases, wherein said second set of predefined trigger phrases is associated with a second type of criterion;

extracting a second criterion from the second passage, wherein said second criterion is associated with the second type of criterion;

searching a candidate resume for said first and second criterions;

if said first criterion is found in the candidate resume, then including said candidate resume in the search results; and if said first criterion is not found in the candidate resume, and the second criterion is found in the candidate resume, then omitting the candidate resume from the search results.

2. The method of claim 1, wherein said candidate resume is a first candidate resume, further comprising the steps of:

searching a second candidate resume for said first and second criterions;

if said first criterion is found in both the first and the second candidate resumes, and said second criterion is found in the first candidate resume and not found in the second candidate resume, then listing the first candidate resume in a first portion of the search results and listing the second candidate resume in a second portion of the search results.

3. The method of claim 2, wherein said first portion is listed in the search results above said second portion.

4. A computer-readable medium carrying one or more sequences of instructions which, when executed by one or more processors, cause the one or more processors to perform the method recited in claim 3.

5. A computer-readable medium carrying one or more sequences of instructions which, when executed by one or more processors, cause the one or more processors to perform the method recited in claim 2.

6. The method of claim 1, wherein said first type of criterion is a required type and said second type of criterion is an optional type.

7. The method of claim 6, wherein the first set of predefined trigger phrases includes phrases selected from the group of phrases consisting of "require", "requires", "requirement", "compulsory", "crucial", "essential", "imperative", "must", "mandatory", "vital", "imperative", "necessary", "qualification", "prerequisite", "key criteria", "is key", "got to", "has to", "have to" and "key skill"; and the second set of predefined trigger phrases includes phrases selected from the group of phrases consisting of "optional", "desired", and "preferred".

8. A computer-readable medium carrying one or more sequences of instructions which, when executed by one or more processors, cause the one or more processors to perform the method recited in claim 7.

9. A computer-readable medium carrying one or more sequences of instructions which, when executed by one or more processors, cause the one or more processors to perform the method recited in claim 6.

10. The method of claim 1, wherein the step of identifying a first passage in the job description that includes a first trigger phrase comprises identifying a clause of a sentence in the job description that contains a trigger phrase selected from the first set of trigger phrases; and the step of extracting a first criterion from the first passage comprises extracting a portion of the identified clause that does not contain the first trigger phrase.

11. A computer-readable medium carrying one or more sequences of instructions which, when executed by one or more processors, cause the one or more processors to perform the method recited in claim 10.

12. The method of claim 1, wherein the step of identifying a first passage in the job description that includes a first trigger phrase comprises identifying in the job description a trigger phrase from the first set of trigger phrases followed by either a colon or a hyphen; and the step of extracting a first criterion from the first passage comprises extracting the sentence that follows the colon or hyphen that follows the first trigger phrase in the job description.

13. The method of claim 12, wherein the step of validating the first criterion comprises:

determining whether the first trigger phrase in the first passage is part of a phrase from a set of nontrigger phrases; and if the first trigger phrase in the first passage is part of a phrase from a set of nontrigger phrases, then determining that the first criterion is not valid.

14. A computer-readable medium carrying one or more sequences of instructions which, when executed by one or more processors, cause the one or more processors to perform the method recited in claim 13.

15. A computer-readable medium carrying one or more sequences of instructions which, when executed by one or more processors, cause the one or more processors to perform the method recited in claim 12.

16. The method of claim 1, wherein the step of extracting a first criterion from the first passage further comprises validating the first criterion; and the step of searching a candidate resume for said first and second criterions comprises searching a candidate resume for said first and second valid criterions.

17. The method of claim 16, wherein the step of validating the first criterion comprises:

determining whether the first trigger phrase in the first passage is preceded by a negating word; and if the first trigger phrase is preceded by a negating word, then determining that the first criterion is not valid.

18. A computer-readable medium carrying one or more sequences of instructions which, when executed by one or more processors, cause the one or more processors to perform the method recited in claim 17.

19. A computer-readable medium carrying one or more sequences of instructions which, when executed by one or more processors, cause the one or more processors to perform the method recited in claim 16.

20. The method of claim 1, further comprising:

identifying a third passage in the job description that includes a third trigger phrase from the first set of predefined trigger phrases;

extracting a third criterion from the third passage, wherein said third criterion is associated with the first type of criterion;

searching a candidate resume for said first, second and third criterions;

if both said first criterion and said third criterion are found in the candidate resume, then including said candidate resume in the search results; and if either said first criterion or said third criterion is not found in the candidate resume, then omitting the candidate resume from the search results.

21. A computer-readable medium carrying one or more sequences of instructions which, when executed by one or more processors, cause the one or more processors to perform the method recited in claim 20.

22. A computer-readable medium carrying one or more sequences of instructions which, when executed by one or more processors, cause the one or more processors to perform the method recited in claim 1.

* * * * *

UNITED STATES PATENT AND TRADEMARK OFFICE
CERTIFICATE OF CORRECTION

PATENT NO. : 7,379,929 B2  Page 1 of 1
APPLICATION NO. : 10/673035
DATED : May 27, 2008
INVENTOR(S) : Lisa C. Meteyer et al.

It is certified that error appears in the above-identified patent and that said Letters Patent is hereby corrected as shown below:

Title page, item (56) References Cited, U.S. Patent Documents:

Insert -- 5,164,899    11/1992  Sobotka et al.
               5,197,004     3/1993  Sobotka et al.
               5,999,939    12/1999  de Hilster et al.
               6,473,730 B1  10/2002  McKeown et al. --

Title page, item (56) References Cited, Other Publications:

Insert -- WO 00/26839   5/2000   Andleigh et al.
           PCT International Search Report for PCT/US2004/028903
           PCT claims for PCT/US2004/028903 --

Signed and Sealed this

Second Day of June, 2009

JOHN DOLL
*Acting Director of the United States Patent and Trademark Office*